(12) United States Patent
Ning et al.

(10) Patent No.: US 9,298,037 B2
(45) Date of Patent: Mar. 29, 2016

(54) SUNLIGHT COLLECTING DEVICE AND LIQUID CRYSTAL DISPLAY USING SUNLIGHT AS A BACKLIGHT SOURCE

(71) Applicant: Shenzhen China Star Optoelectronics Technology Co., Ltd., Shenzhen, Guangdong (CN)

(72) Inventors: Chao Ning, Guangming (CN); Sheng-Jer Chang Chien, Guangming (CN); Qian Cao, Guangming (CN); Dehua Li, Guangming (CN); Guofu Tang, Guangming (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 321 days.

(21) Appl. No.: 14/129,991

(22) PCT Filed: Dec. 13, 2013

(86) PCT No.: PCT/CN2013/089349
§ 371 (c)(1),
(2) Date: Dec. 30, 2013

(87) PCT Pub. No.: WO2015/074303
PCT Pub. Date: May 28, 2015

(65) Prior Publication Data
US 2015/0146133 A1 May 28, 2015

(30) Foreign Application Priority Data
Nov. 25, 2013 (CN) .......................... 2013 1 0607979

(51) Int. Cl.
*G02F 1/1335* (2006.01)
*G02B 3/08* (2006.01)
(Continued)

(52) U.S. Cl.
CPC ................. *G02F 1/1336* (2013.01); *F24J 2/08* (2013.01); *G01J 1/0238* (2013.01); *G01J 1/0411* (2013.01);
(Continued)

(58) Field of Classification Search
CPC ................... F24J 2/02; F24J 2/08; F24J 2/38; F24J 2/40; F24J 2/407; F24J 2002/385
USPC ......... 349/62, 64, 65; 126/569, 573, 680, 698
See application file for complete search history.

(56) References Cited

U.S. PATENT DOCUMENTS

2009/0250094 A1\* 10/2009 Robison ..................... F24J 2/06
136/246
2011/0259319 A1 10/2011 Yabe et al.
2014/0125920 A1\* 5/2014 Hu ....................... G02B 6/0016
349/65

FOREIGN PATENT DOCUMENTS

CN 201594150 U 9/2010
CN 102074605 A 5/2011
(Continued)

Primary Examiner — Thanh-Nhan P Nguyen
(74) Attorney, Agent, or Firm — JMB Davis Ben-David

(57) ABSTRACT

A sunlight collecting device provided in the present invention includes a lens substrate, a plurality of Fresnel lens, a connector substrate, a plurality of optical fiber connectors, and a light-tracking substrate. The lens substrate has a plurality of circular openings. The Fresnel lenses correspond to the circular opening and are disposed on the lens substrate. The connector substrate is disposed parallel to the lens substrate and away from the lens substrate with a focal length. The optical fiber connectors are adjustably disposed on the connector substrate. The light-tracking substrate is disposed between the lens substrate and the connector substrate for simultaneously rotating the lens substrate and the connector substrate such that the Fresnel lenses are directly opposite to the sunlight. An LCD using the sunlight as a backlight source is further provided in the present invention.

14 Claims, 3 Drawing Sheets

(51) Int. Cl.
*G01J 1/02* (2006.01)
*G01J 1/04* (2006.01)
*G01J 1/42* (2006.01)
*F21V 8/00* (2006.01)
*F24J 2/08* (2006.01)
*G02B 3/00* (2006.01)
*G02B 19/00* (2006.01)
*G02B 6/32* (2006.01)
*G02B 6/04* (2006.01)

(52) U.S. Cl.
CPC ............ *G01J 1/0422* (2013.01); *G01J 1/0448* (2013.01); *G01J 1/0451* (2013.01); *G01J 1/42* (2013.01); *G02B 3/0037* (2013.01); *G02B 3/08* (2013.01); *G02B 6/0006* (2013.01); *G02B 19/0014* (2013.01); *G02B 19/0042* (2013.01); *G01J 2001/4266* (2013.01); *G02B 6/04* (2013.01); *G02B 6/32* (2013.01); *G02F 2001/133612* (2013.01)

(56) References Cited

FOREIGN PATENT DOCUMENTS

| | | |
|---|---|---|
| CN | 201837763 U | 5/2011 |
| CN | 102403929 A | 4/2012 |
| CN | 202364156 U | 8/2012 |

* cited by examiner

SUNLIGHT COLLECTING DEVICE AND LIQUID CRYSTAL DISPLAY USING SUNLIGHT AS A BACKLIGHT SOURCE

FIELD OF THE INVENTION

The present invention relates to a sunlight utilization technology, and especially to a sunlight collecting device and a liquid crystal display (LCD) using sunlight as a backlight source.

BACKGROUND OF THE INVENTION

Because the LCD is incapable of actively emitting light at the present stage, the LCD needs to utilize a backlight module served as a light source. A conventional backlight source is a light emitting diode or a cold cathode fluorescent lamp, both of which are driven by electric power. However, the backlight source of the LCD accounts for about 80% of total power consumption of the whole system. Under long-term use, its energy consumption is very considerable. In types of power generation currently used, the main sources of the power generation are oil-burning power generation and nuclear power, and they bring problems of environment pollution, the greenhouse effect that causes climate change and other related environmental impacts.

Natural sunlight is green natural energy, and its spectrum contains visible wavelengths required for the backlight source. If the sunlight can be collected by using a light collection system to provide for the backlight source, the power consumption thereof can be greatly reduced.

However, no one has yet proposed such a sunlight collecting device that is capable of efficiently collecting the sunlight to serve as the backlight source.

SUMMARY OF THE INVENTION

An objective of the present invention is to provide a sunlight collecting device which can efficiently collect the sunlight to serve as a backlight source.

Another objective of the present invention is to provide an LCD using the sunlight as the backlight source. The LCD employs the above-mentioned sunlight collecting device to collect the sunlight and transmits the sunlight to the backlight module via an optical fiber, thereby overcoming the problem of the high power consumption of the conventional backlight module.

To achieve the foregoing objective, a preferred embodiment of the present invention provides a sunlight collecting device, which includes a lens substrate, a plurality of Fresnel lens, a connector substrate, a plurality of optical fiber connectors, and a light-tracking substrate. The lens substrate has a plurality of circular openings. The Fresnel lenses correspond to the circular opening and are disposed on the lens substrate. The Fresnel lenses have an identical focal length for focusing the sunlight. The connector substrate is disposed parallel to the lens substrate and away from the lens substrate with the focal length. The optical fiber connectors are adjustably disposed on the connector substrate for making the focused sunlight be coupled into the optical fiber. The light-tracking substrate is disposed between the lens substrate and the connector substrate. The light-tracking substrate has a plurality of hollow openings such that the focused sunlight can pass through the light-tracking substrate, and the light-tracking substrate is utilized to rotate the lens substrate and the connector substrate such that the Fresnel lenses are directly opposite to the sunlight.

In the sunlight collecting device of the preferred embodiment of the present invention, the sunlight collecting device further includes a sunlight-tracking controller, which is coupled to the light-tracking substrate and utilized to drive the light-tracking substrate for simultaneously rotating the lens substrate and the connector substrate.

In the sunlight collecting device of the preferred embodiment of the present invention, the Fresnel lenses are located on an identical plane.

In the sunlight collecting device of the preferred embodiment of the present invention, the optical fiber connectors can be fine tuned on the connector substrate.

In the sunlight collecting device of the preferred embodiment of the present invention, a plurality of supporting columns are disposed between the lens substrate, the connector substrate and the light-tracking substrate, so as to fix relative positions between the lens substrate, the connector substrate and the light-tracking substrate.

Similarly, to achieve the foregoing objective, another preferred embodiment of the present invention provides an LCD using the sunlight as the backlight source, which includes a display panel and a backlight module providing uniform light for the display panel. The LCD further includes a sunlight collecting device, which is disposed at outdoors and coupled to the backlight module via an optical fiber, is utilized to provide the backlight source for the backlight module.

The sunlight collecting device includes: a lens substrate having circular openings; Fresnel lenses corresponding to the circular openings and disposed on the lens substrate, the Fresnel lenses having an identical focal length for focusing the sunlight; a connector substrate disposed parallel to the lens substrate and away from the lens substrate with the focal length; optical fiber connectors adjustably disposed on the connector substrate for making the focused sunlight be coupled into the optical fiber; and a light-tracking substrate disposed between the lens substrate and the connector substrate, the light-tracking substrate having a plurality of hollow openings such that the focused sunlight can pass through the light-tracking substrate, the light-tracking substrate utilized to rotate the lens substrate and the connector substrate such that the Fresnel lenses are directly opposite to the sunlight.

In the LCD of the embodiment, the sunlight collecting device further includes a sunlight-tracking controller coupled to the light-tracking substrate, utilized to drive the light-tracking substrate for simultaneously rotating the lens substrate and the connector substrate.

In the LCD of the embodiment, the Fresnel lenses are located on an identical plane.

In the LCD of the embodiment, the optical fiber connectors can be fine tuned on the connector substrate.

In the LCD of the embodiment, a plurality of supporting columns are disposed between the lens substrate, the connector substrate and the light-tracking substrate, so as to fix relative positions between the lens substrate, the connector substrate and the light-tracking substrate.

In comparison with the prior art, the present invention creates the sunlight collecting device which can ensure that the lenses are positioned on the same plane by means of the Fresnel lenses being disposed on the lens substrate. More specifically, by means of the connector substrate parallel to the lens substrate, it can ensure that the focused sunlight can be coupled into the optical fiber via the optical fiber connectors. Meanwhile, the optical fiber connectors can be fine tuned on the connector substrate, so that the focused light by the lenses can be coupled into the optical fiber more precisely. In addition, by means of the sunlight collecting device collecting the sunlight to serve as the backlight source of the backlight module, the present invention overcomes the problem of the power consumption in the prior art backlight source.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
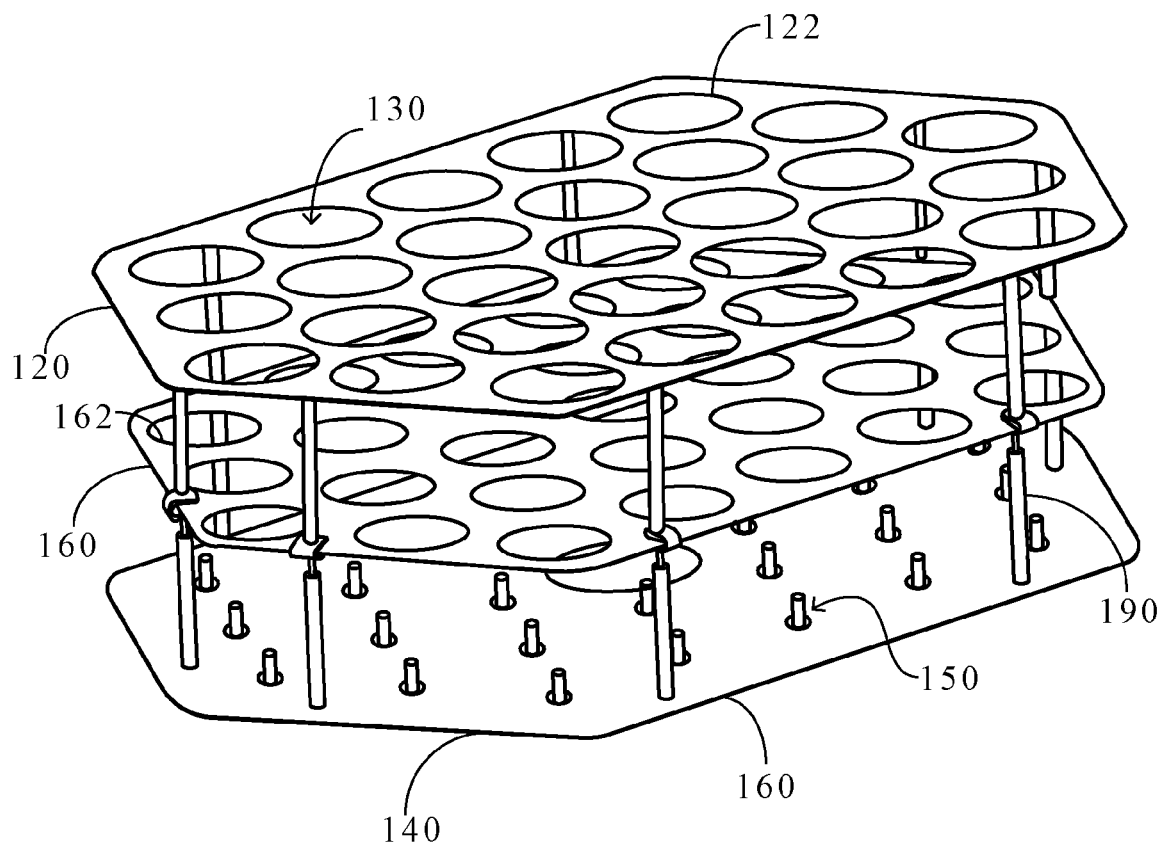
FIG. 1 is a perspective view schematically illustrating a sunlight collecting device according to one preferred embodiment of the present invention.
Figure 2:
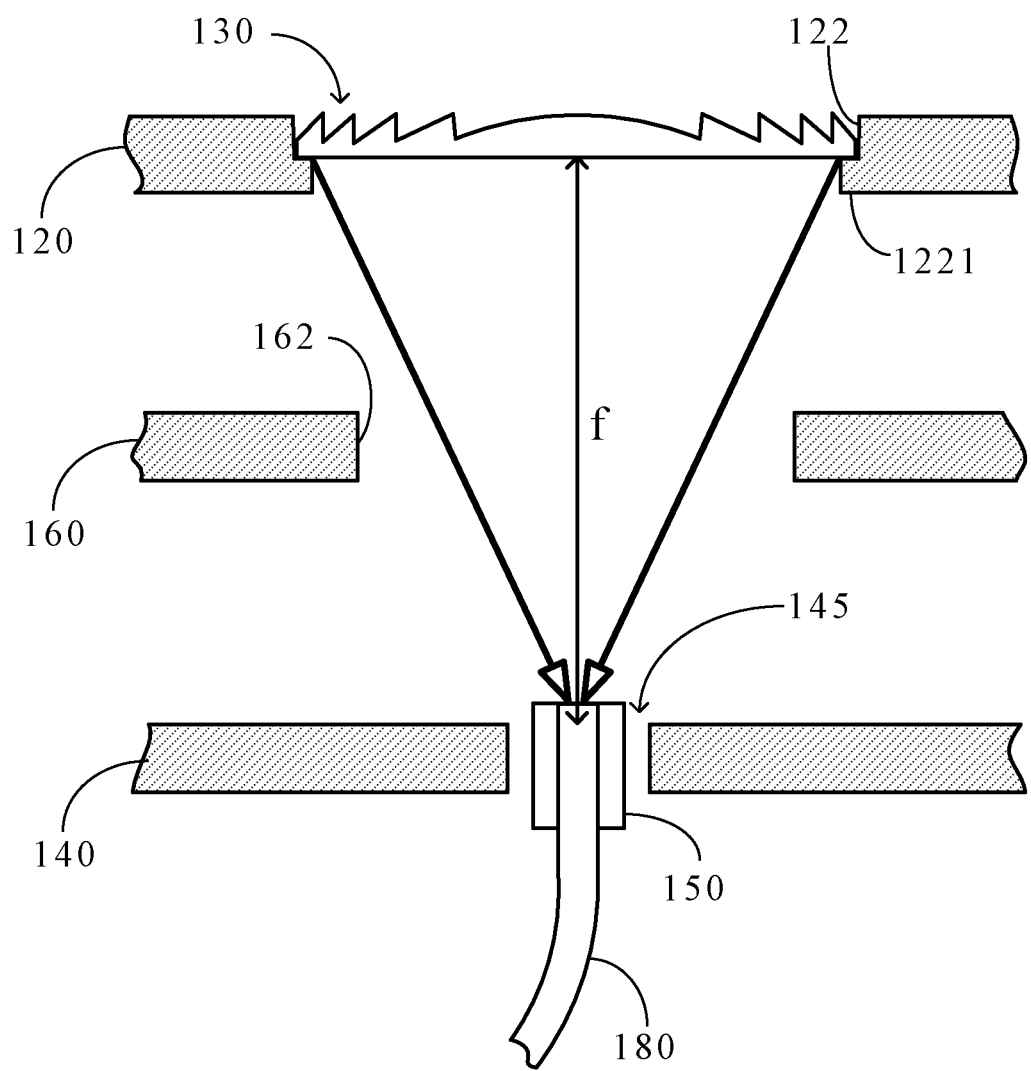
FIG. 2 is a partial sectional view of FIG. 1.

Referring to FIG. 1 and FIG. 2, FIG. 1 is a perspective view schematically illustrating a sunlight collecting device according to one preferred embodiment of the present invention; FIG. 2 is a partial sectional view of FIG. 1. It should be noted that the above-mentioned drawings are just for explanation, and they are not depicted in real proportion. The sunlight collecting device 10 of the embodiment is disposed at outdoors for collecting sunlight, and it includes a lens substrate 120, a plurality of Fresnel lens 130, a connector substrate 140, a plurality of optical fiber connectors 150, and a light-tracking substrate 160.

As shown in FIG. 1, the lens substrate 120 has a plurality of circular openings 122. The circular openings 122 are preferably arranged in a hexagonal close-packed (HCP), thereby making full use of area of the lens substrate 120. However, the present invention is not limited thereto.

The Fresnel lenses 130 that correspond to the circular openings 122 are disposed on the lens substrate 120. As shown in FIG. 2, the Fresnel lenses 130 reduce the amount of material required compared to a conventional spherical lens by dividing the lens into a set of concentric annular sections and have the same optical effects thereof. More specifically, because the Fresnel lenses 130 are disposed on the same substrate, the Fresnel lenses are located on an identical plane without carrying out a horizontal calibration. Preferably, a flange 122 can be designed around each of the circular openings 122, and the Fresnel lens 130 can be mounted on the flange 122.

The Fresnel lenses 130 have an identical focal length f for focusing the sunlight. Moreover, the connector substrate 140 is disposed parallel to the lens substrate 120 and away from the lens substrate 120 with about the focal length f. That is to say, all the Fresnel lenses 130 focus the sunlight onto the connector substrate 140. Therefore, the optical fiber connectors 150 are adjustably disposed on the connector substrate 140 for making the focused sunlight be coupled into the optical fiber 180.

As shown in FIG. 2, the connector substrate 140 has a plurality of locating holes, which correspond to focus points of the Fresnel lenses 130, defined thereon. Then the optical fiber connectors 150 are located in the locating holes. Specifically, each of the optical fiber connectors 150 further has a fastening mechanism (not shown), so that the optical fiber connector 150 can be fixed at a predetermined position within the locating hole 145. More specifically, the fastening mechanism can be a combination of a bolt and a nut or other suitable mechanisms. By the above-mentioned fastening mechanism, the optical fiber connectors 150 can be fine tuned on the connector substrate 140, so that the focused sunlight can be coupled into the optical fiber 180 more precisely, thereby improving utilization of the light.

As shown in FIG. 1 and FIG. 2, the light-tracking substrate 160 is disposed between the lens substrate 120 and the connector substrate 140, preferably disposed between the lens substrate 120 and the connector substrate 140 in parallel. The light-tracking substrate 160 has a plurality of hollow openings 162 such that the focused sunlight can pass through the light-tracking substrate 160. Preferably, the hollow openings 162 can be defined to correspond to the circular openings 122 of the lens substrate 120, and the hollow openings 162 are preferably less than or equal to the circular openings 122. Specifically, the light-tracking substrate 160 is utilized to simultaneously rotate the lens substrate 120 and the connector substrate 140 such that the Fresnel lenses 130 are directly opposite to an incident direction of the sunlight.

As shown in FIG. 1, a plurality of supporting columns 190 are disposed between the lens substrate 120, the connector substrate 140 and the light-tracking substrate 160, so as to fix relative positions between the lens substrate 120, the connector substrate 140 and the light-tracking substrate 160. However, the present invention is not limited thereto. For example, there are side walls (not shown) being disposed between the lens substrate 120, the connector substrate 140 and the light-tracking substrate 160, so as to fix the relative positions between the three.

In the embodiment, the sunlight collecting device 10 further includes a sunlight-tracking controller 195 (shown in FIG. 3), which is coupled to the light-tracking substrate 160 and utilized to drive the light-tracking substrate 160 for simultaneously rotating the lens substrate 120 and the connector substrate 140. Specifically, the sunlight-tracking controller 195 may include an electronic control system and a drive mechanism, such as connecting shafts, electric lifting cylinders, pivoting structures, and so on. No further detail will be provided herein. In addition, the sunlight-tracking controller 195 also can be coupled to the supporting columns 190.

Figure 3:
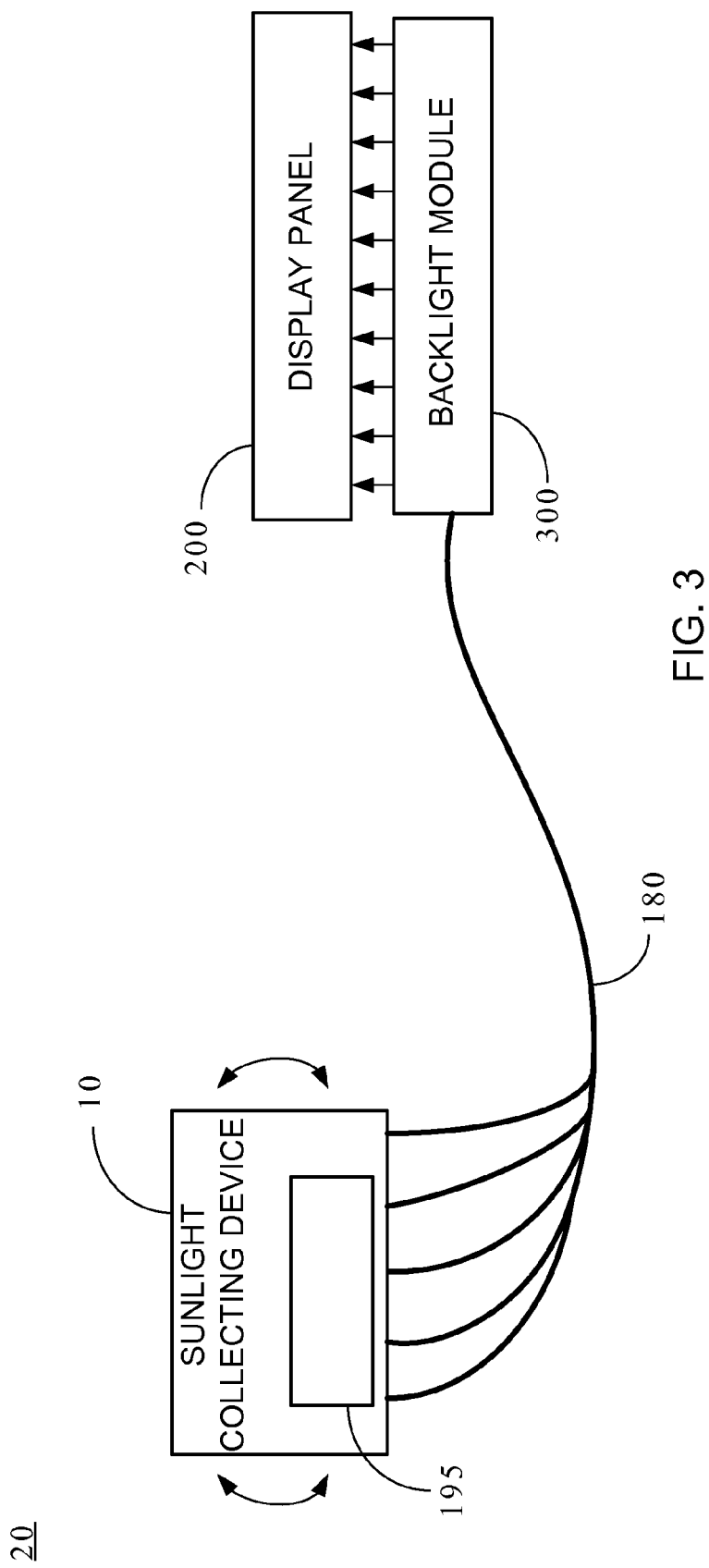
FIG. 3 is a block diagram illustrating an LCD using sunlight as a backlight source according to a preferred embodiment of the present invention.

An LCD using sunlight as a backlight source by employing the sunlight collecting device 10 of the above-mentioned embodiment will be explained in the following. Referring to FIG. 3, FIG. 3 is a block diagram illustrating an LCD 20 using sunlight as a backlight source according to a preferred embodiment of the present invention. The LCD 20 includes a display panel 200 and a backlight module 300 which provides uniform light for the display panel 200. The LCD 20 further includes a sunlight collecting device 10, which is disposed at outdoors and coupled to the backlight module 300 via an optical fiber 180. The sunlight collecting device 10 is utilized to provide the backlight source for the backlight module 300.

Referring to FIG. 1 and FIG. 2, the sunlight collecting device 10 includes a lens substrate 120, a plurality of Fresnel lens 130, a connector substrate 140, a plurality of optical fiber connectors 150, and a light-tracking substrate 160. The lens substrate 120 has a plurality of circular openings 122. The Fresnel lenses 130 that correspond to the circular openings 122 are disposed on the lens substrate 120. The Fresnel lenses 130 have an identical focal length f for focusing the sunlight. The connector substrate 140 is disposed parallel to the lens substrate 120 and away from the lens substrate 120 with the focal length f. The optical fiber connectors 150 are adjustably disposed on the connector substrate 140 for making the focused sunlight be coupled into the optical fiber 180. The light-tracking substrate 160 is disposed between the lens substrate 120 and the connector substrate 140. The light-tracking substrate 160 has a plurality of hollow openings 162 such that the focused sunlight can pass through the light-tracking substrate 160. The light-tracking substrate 160 is utilized to simultaneously rotate the lens substrate 120 and the connector substrate 140 such that the Fresnel lenses 130 are directly opposite to the sunlight. The descriptions of these elements have been explained as mentioned previously, so no further detail will be provided herein.

Similarly, the sunlight collecting device 10 further includes a sunlight-tracking controller 195, which is coupled to the light-tracking substrate 160 and utilized to drive the light-tracking substrate 160 for simultaneously rotating the lens substrate 120 and the connector substrate 140. In addition, the Fresnel lenses 130 are located on an identical plane without the horizontal calibration. The optical fiber connectors 150 can be fine tuned on the connector substrate 140, so that the focused light can be coupled into the optical fiber 180 more precisely. Similarly, a plurality of supporting columns 190 are disposed between the lens substrate 120, the connector substrate 140 and the light-tracking substrate 160, so as to fix relative positions between the lens substrate 120, the connector substrate 140 and the light-tracking substrate 160.

In summary, the sunlight collecting device 10 of the embodiment can ensure that the lenses are positioned on the same plane by means of the Fresnel lenses 130 being disposed on the lens substrate 120. More specifically, by means of the connector substrate 120 being parallel to the lens substrate 140, it can ensure that the focused sunlight can be coupled into the optical fiber 180 via the optical fiber connectors 150. Meanwhile, the optical fiber connectors 150 can be fine tuned on the connector substrate 140, so that the focused light by the lenses can be coupled into the optical fiber 180 more precisely. In addition, by means of the sunlight collecting device 10 collecting the sunlight to serve as the backlight source of the backlight module 300, the present invention overcomes the problem of the power consumption in the prior art backlight source.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid crystal display (LCD) using sunlight as a backlight source, comprising a display panel and a backlight module providing uniform light for the display panel, the LCD further comprising:
    a sunlight collecting device, which is coupled to the backlight module via an optical fiber, utilized to provide the backlight source for the backlight module, the sunlight collecting device comprising:
        a lens substrate having a plurality of circular openings;
        a plurality of Fresnel lenses corresponding to the circular openings and disposed on the lens substrate, the Fresnel lenses having an identical focal length for focusing the sunlight;
        a connector substrate disposed parallel to the lens substrate and away from the lens substrate with the focal length;
        a plurality of optical fiber connectors adjustably disposed on the connector substrate for making the focused sunlight be coupled into the optical fiber;
        a light-tracking substrate disposed between the lens substrate and the connector substrate, the light-tracking substrate having a plurality of hollow openings such that the focused sunlight can pass through the light-tracking substrate, the light-tracking substrate utilized to simultaneously rotate the lens substrate and the connector substrate such that the Fresnel lenses are directly opposite to the sunlight; and
        a sunlight-tracking controller coupled to the light-tracking substrate, utilized to drive the light-tracking substrate for simultaneously rotating the lens substrate and the connector substrate.

2. The LCD according to claim 1, wherein the Fresnel lenses are located on an identical plane.

3. The LCD according to claim 1, wherein the optical fiber connectors can be fine tuned on the connector substrate.

4. The LCD according to claim 1, further comprising a plurality of supporting columns disposed between the lens substrate, the connector substrate and the light-tracking substrate, so as to fix relative positions between the lens substrate, the connector substrate and the light-tracking substrate.

5. A sunlight collecting device, comprising:
    a lens substrate having a plurality of circular openings;
    a plurality of Fresnel lenses corresponding to the circular openings and disposed on the lens substrate, the Fresnel lenses having an identical focal length for focusing the sunlight;
    a connector substrate disposed parallel to the lens substrate and away from the lens substrate with the focal length;
    a plurality of optical fiber connectors adjustably disposed on the connector substrate for making the focused sunlight be coupled into the optical fiber; and
    a light-tracking substrate disposed between the lens substrate and the connector substrate, the light-tracking substrate having a plurality of hollow openings such that the focused sunlight can pass through the light-tracking substrate, the light-tracking substrate utilized to simultaneously rotate the lens substrate and the connector substrate such that the Fresnel lenses are directly opposite to the sunlight.

6. The sunlight collecting device according to claim 5, further comprising a sunlight-tracking controller coupled to the light-tracking substrate and utilized to drive the light-tracking substrate for simultaneously rotating the lens substrate and the connector substrate.

7. The sunlight collecting device according to claim 5, wherein the Fresnel lenses are located on an identical plane.

8. The sunlight collecting device according to claim 5, wherein the optical fiber connectors can be fine tuned on the connector substrate.

9. The sunlight collecting device according to claim 5, further comprising a plurality of supporting columns disposed between the lens substrate, the connector substrate and the light-tracking substrate, so as to fix relative positions between the lens substrate, the connector substrate and the light-tracking substrate.

10. An LCD using sunlight as a backlight source, comprising a display panel and a backlight module providing uniform light for the display panel, the LCD further comprising:

a sunlight collecting device, which is coupled to the backlight module via an optical fiber, utilized to provide the backlight source for the backlight module, the sunlight collecting device comprising:
  a lens substrate having a plurality of circular openings;
  a plurality of Fresnel lenses corresponding to the circular openings and disposed on the lens substrate, the Fresnel lenses having an identical focal length for focusing the sunlight;
  a connector substrate disposed parallel to the lens substrate and away from the lens substrate with the focal length;
  a plurality of optical fiber connectors adjustably disposed on the connector substrate for making the focused sunlight be coupled into the optical fiber; and
  a light-tracking substrate disposed between the lens substrate and the connector substrate, the light-tracking substrate having a plurality of hollow openings such that the focused sunlight can pass through the light-tracking substrate, the light-tracking substrate utilized to simultaneously rotate the lens substrate and the connector substrate such that the Fresnel lenses are directly opposite to the sunlight.

11. The LCD according to claim 10, wherein the sunlight collecting device further comprises a sunlight-tracking controller coupled to the light-tracking substrate and utilized to drive the light-tracking substrate for simultaneously rotating the lens substrate and the connector substrate.

12. The LCD according to claim 10, wherein the Fresnel lenses are located on an identical plane.

13. The LCD according to claim 10, wherein the optical fiber connectors can be fine tuned on the connector substrate.

14. The LCD according to claim 10, further comprising a plurality of supporting columns disposed between the lens substrate, the connector substrate and the light-tracking substrate, so as to fix relative positions between the lens substrate, the connector substrate and the light-tracking substrate.

* * * * *